(12) United States Patent
Starr et al.

(10) Patent No.: US 12,423,790 B2
(45) Date of Patent: Sep. 23, 2025

(54) COMPUTER-VISION BASED WORKPLACE SAFETY

(71) Applicants: Justin Starr, Baden, PA (US); Ashish Basuray, Petaluma, CA (US)

(72) Inventors: Justin Starr, Baden, PA (US); Ashish Basuray, Petaluma, CA (US)

( * ) Notice: Subject to any disclaimer, the term of this patent is extended or adjusted under 35 U.S.C. 154(b) by 421 days.

(21) Appl. No.: 17/688,570

(22) Filed: Mar. 7, 2022

(65) Prior Publication Data

US 2022/0284566 A1 Sep. 8, 2022

Related U.S. Application Data

(60) Provisional application No. 63/157,940, filed on Mar. 8, 2021.

(51) Int. Cl.
*G06V 20/52* (2022.01)
*G06T 7/00* (2017.01)

(52) U.S. Cl.
CPC .. *G06T 7/0004* (2013.01); *G06T 2207/30108* (2013.01)

(58) Field of Classification Search
CPC ........ G06T 7/0004; G06T 2207/30108; G06V 10/82; G06V 20/52
See application file for complete search history.

(56) References Cited

U.S. PATENT DOCUMENTS

| | | | |
|---|---|---|---|
| 2009/0089108 A1* | 4/2009 | Angell | G06Q 10/0635 705/7.28 |
| 2020/0202471 A1* | 6/2020 | Barak | G06Q 10/063114 |
| 2021/0053224 A1* | 2/2021 | Schroeder | B25J 9/1651 |
| 2021/0096027 A1* | 4/2021 | Nunez Sanchez | G01J 3/12 |

OTHER PUBLICATIONS

Ding, Lieyun, et al. "A deep hybrid learning model to detect unsafe behavior: Integrating convolution neural networks and long short-term memory." Automation in construction 86 (2018): 118-124. (Year: 2018).*

Xu, Wenpei, and Ting-Kwei Wang. "Dynamic safety prewarning mechanism of humanamachineaenvironment using computer vision" Engineering, Construction and Architectural Management 27.8 (2020): 1813-1833. (Year: 2020).*

* cited by examiner

*Primary Examiner* — Sean M Conner
(74) *Attorney, Agent, or Firm* — Gabriel & Co; Andrew M Gabriel (57) ABSTRACT

An example provides a method, including: obtaining, using one or more sensor systems, sensor data for one or more persons in an environment comprising machinery; analyzing, using a processor, the sensor data using a trained model to identify the one or more persons and an associated time series of actions; determining, using the associated time series of actions, if the one or more persons are engaging in behavior indicative of an unsafe practice; and thereafter presenting safety information to a visual display system, connected software system or other decision support tool.

14 Claims, 5 Drawing Sheets

COMPUTER-VISION BASED WORKPLACE SAFETY

FIELD

An embodiment operates in the field of automated or semi-automated image analysis of individuals and machinery.

BACKGROUND

The United States Bureau of Labor Statistics consistently ranks manufacturing as one of the 10 most dangerous occupations for workers in the United States. In 2019 alone, more than 395,300 nonfatal workplace injuries were reported with an additional 350 deaths. These statistics contribute to the image of manufacturing as an outdated, dangerous occupation, and make it difficult for employers to attract talent. They also dramatically increase the cost of manufacturing—some firms estimate that employers nationwide spend more than $1 billion per week on direct workers' compensation costs—a figure which excludes the cost of unplanned downtime and lost productivity, and makes U.S.-based firms less competitive in the global manufacturing marketplace.

Tragically, while aberrant accidents can and do occur, most of these incidents are preventable. The Occupational Health and Safety Administration (OSHA) cites a number of safety violations as top contributors to workplace injuries and deaths—including improper hazard communication, lockout/tagout violations, improper use of personal protective equipment, and improper machine guarding in place. Manual interlocks are not sufficient—workers may disable a faulty guard in the interest of productivity, and safety barriers cannot check for hazards like loose clothing or long hair.

Incidents like these are of particular interest to multiple sectors of the economy including but not limited to the manufacturing sector, labor unions, and insurance companies— every incident requires extensive retraining and newsworthy occurrences can overshadow even the most technologically impressive advance. While progress has been made in recent years, nearly 20 people die every year from on-the-job injuries—a trend that has persisted since 2015, according to the Bureau of Labor Statistics (BLS). Declines in 2020 and 2021 may be attributed to reduced working hours stemming from the COVID-19 pandemic and are not cause to celebrate in and of themselves.

SUMMARY

In summary, one aspect provides a method, comprising: obtaining, using one or more sensor systems, sensor data for one or more persons in an environment comprising machinery; analyzing, using a processor, the sensor data using a trained model to identify the one or more persons and an associated time series of actions; determining, using the associated time series of actions, if the one or more persons are engaging in behavior indicative of an unsafe practice; and thereafter presenting safety information to a visual display system, connected software system or other decision support tool.

Another aspect provides a system, comprising: one or more sensors; one or more processors; and a non-transitory storage device operatively coupled to the sensor and the one or more processors, the non-transitory storage device comprising code configured to: obtain sensor data for one or more persons in an environment comprising machinery; analyze the sensor data using a trained model to identify the one or more persons and an associated time series of actions; determine, using the associated time series of actions, if the one or more persons are engaging in behavior indicative of an unsafe practice; and thereafter provide safety information to a visual display system, connected software system or other decision support tool.

A further aspect provides a computer program product, comprising: a non-transitory storage device comprising code configured to: obtain sensor data for one or more persons in an environment comprising machinery; analyze the sensor data using a trained model to identify the one or more persons and an associated time series of actions; determine, using the associated time series of actions, if the one or more persons are engaging in behavior indicative of an unsafe practice; and thereafter provide safety information to a visual display system, connected software system or other decision support tool The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

FIG. 7 illustrates as an example the system on chip (SoC) included in a computer is illustrated, which may be used in implementing one or more embodiments, including multispectral pre-processing or running algorithms on the local device.

DETAILED DESCRIPTION OF THE EMBODIMENTS

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

As used in this application, the terms "component," "system," "subsystem," "platform," "controller," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer.

By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application.

As yet another example, a component can be an apparatus that provides specific functionality through electronic components without mechanical parts, the electronic components can include a processor therein to execute software or firmware that provides at least in part the functionality of the electronic components.

As further yet another example, interface(s) can include input/output (I/O) components as well as associated processor, application, or Application Programming Interface (API) components.

While the foregoing examples are directed to aspects of a component, the exemplified aspects or features also apply to a system, platform, interface, controller, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of modules refers to one or more modules.

The terms "a" or "an", as used herein, are defined as one or more than one. The term plurality, as used herein, is defined as two or more than two. The term "another", as used herein, is defined as at least a second or more. The terms "including" and "having," as used herein, are defined as comprising (i.e., open language). The term "coupled', as used herein, is defined as connected, although not necessarily directly, and not necessarily mechanically.

Various aspects or features will be presented in terms of systems that can include a number of devices, components, modules, and the like. It is to be understood and appreciated that the various systems can include additional devices, components, modules, etc. and/or may not include all of the devices, components, modules etc., discussed in connection with the figures. A combination of these approaches also can be used.

The industry has turned to training as a solution to this problem—root cause analyses often indicate that injuries are ultimately caused by knowledge gaps, training failures and unauthorized deviations from protocol. Prevailing wisdom suggests that frequent retraining and refresher courses can ensure that safety remains top of mind to a skilled workforce. However, complacency is inherent in successful employment: workers who perform a task successfully for days on end will often try time-saving procedures. When these procedures succeed, they begin to believe that because incidents have not occurred that they have an intrinsic understanding of what is and isn't safe.

A Pittsburgh-based company provides a case study to illustrate this effect. In 2009, the company was recognized by OSHA as a "star site"—the agency's highest honor, due to the company's success in creating an injury and illness protection plan based on OSHA's Voluntary Protection Program. Worker's compensation cases declined by 29 percent from 2006-2010 and the program was heralded as a success. Unfortunately, the company made the news in 2011 when an experienced worker became trapped in malfunctioning equipment and ultimately died from his injuries.

Other firms in that region have their own stories of incidents: a machine tool firm had an employee suffer serious injuries to both of his arms when he became entangled in an operating lathe. Even though the employee was trained in best practices, he still chose to wear gloves on the day of the incident, and remains in a long-term care facility, recovering from his injuries. Another incident occurred at a major producer of industrial goods where an employee suffered a near miss in a hydraulic press when he bypassed a malfunctioning guard in order to maintain production quotas. Because he was not injured, the incident was not reported to management, even though he was a few milliseconds away from losing a finger.

While education and training programs are valuable, they are not sufficient to standalone as the core of an effective industrial safety program. Instead they must be coupled with monitoring and compliance programs. Driver's education programs may teach commuters not to speed, but law enforcement and speed traps are crucial to compliance. However, just as drivers will speed on infrequently-patrolled stretches of highway, so too will workers deviate from safety training in seldom-monitored job sites. Inspections and audits are limited by the availability of trained personnel.

Computer vision provides a promising solution to this problem. While human inspectors and auditors have limited availability, an installed camera system can be operational at all times. Historically, effective use of CCTV systems required a human-in-the-loop to regularly monitor footage for evidence of safety violations, intervene and follow up with an offending worker. With the development of graphics processing units and trained neural networks, it is now possible to deploy a system that can detect safety violations performed by a worker in real-time. Feedback can be provided through formal intervention, informal decision support tools or rigid safety interlock systems.

An embodiment—the Safety Detection System (SDS)—provides benefits for the operators of machinery in the workplace. While the individual manufacturers may vary widely in terms of equipment setup, products produced and personnel structure, all have a shared interest in promoting a culture of safety and reducing the incidents of workplace injuries or deaths. An embodiment provides a standalone injury detection system that can identify common safety violations and alert a worker or other user of this deficiency. Using a standard RGB camera and a single-board computer with an embedded GPU, the standalone system of an embodiment can be deployed at any piece of equipment with a reliable source of power. Further, a modular design can generate custom models on the fly, meaning an embodiment can be easily adapted to fit conditions specific to each deployment site (employee pose and position, environmental lighting, etc.).

An embodiment develops a cost-effective neural network for incident detection. It relies on commercially available spatial classification systems and combines them with a custom-developed temporal classifier. While many neural networks are capable of being trained to detect the presence of absence of objects—such as personal protective equipment (PPE)—an embodiment implements a system that can be trained to detect more complicated gestures that can be broken down into individual components, such as setting a safety interlock, clipping a carabiner onto a fall protection system, and clearing metal chips away from machine tools.

Just as speed cameras can only detect a small portion of traffic violations and are not intended to replace fully-trained police officers, this system is intended to supplement a workplace's existing safety culture and programs by providing continuous monitoring and coverage of critical work cells. An embodiment provides a system able to identify a subset of critical safety violations, while continued data capture, model evaluation and refinement provides the data required to further develop models for broader deployment and different use environments.

An embodiment provides a Safety Detection System (SDS) based on a computer-vision system that is based on both spatial and temporal classifiers. The example SDS identifies when an individual is about to engage in an action deemed to be unsafe and presents a form of feedback to that individual, e.g., on a visible display. The example system is specifically designed to monitor actions rather than positions: an individual may be able to enter a work cell wearing improper PPE, but would receive a notification only when they activate or are about to activate the equipment without addressing the situation per defined rules for doing so.

An embodiment may leverage existing classifiers to accelerate development. In one present example system, an existing spatial classifier (YOLOv3) was trained on various spatial behaviors—reaches, grabs, button presses, etc. This is built upon and combined with a custom "temporal analyzer" that takes the form of a mathematical function. This function could be complex, or as simple as a summation. For example, for any given collection of video frames, F (fi, fi+1 . . . ) spanning t seconds at a rate of n frames per second, and k is the number of classes and rj is the probability of bounding box j representing a class:

$$\forall \text{ frames } f_i \in F \ni R_i = [r_i, r_2, \ldots r_k]$$

$$Pr = g \sum_{i=1}^{m} h(R_i)$$

Then Pr is the probability that a target behavior has occurred, where g and h are the spatial object detection algorithms used. Effectively, this summation allows for effective filtering of errant detections that do not accurately represent gestures—e.g., a single misclassified frame. Only when an individual undergoes significant, deliberate motion is a gesture detected. While such a summation is primitive, it is surprisingly effective at detecting overt behaviors without extensive modification.

This combination of spatial and temporal classification is used for detecting true gestures and weeding out false positives. Individuals may perform a variety of actions that resemble some phase of a target behavior. Distinguishing those actions from true safety violations requires looking at multiple frames of activity in sequence.

Embodiments are intended to learn through data acquisition, as information about true positives can be used to retrain the neural network. Bounded and unbounded learning will eventually train the algorithm to pick up on dangerous behavior that may be difficult for a human to perceive.

Decision support software may be provided on a console or mobile device to assist safety operators in identifying, approaching and quickly alerting the identified individual. History of video data may show all events and behaviors leading up to a safety incident.

This approach may be important to acceptance of such a system and underlies the reason why many previous efforts have failed. Location-based alerts—while useful for areas like high-traffic routes or prohibited entry zones—are inherently crude. Such systems may be able to identify when an individual is exhibiting a safety violation (such as a dangling necktie), and when an individual is in proximity to a piece of equipment (such as a drill press), but have not yet been able to ascertain whether the individual is about to actually use the equipment before correcting the safety violation. The result is a litany of false positives—alerts that activate every time someone adjusts long hair, or walks by a machine with gloves on.

While it is understandable that this could occur from an early product development perspective, it is also unacceptable in terms of individual compliance and industrial psychology. Devices that frequently generate false positives cause alert-fatigue and are typically overridden by default. If every time a user enters a work cell, they need to clear a litany of false positives before using a machine, they are faced with a daunting psychological and cognitive barrier. If an actual warning or alert is present, they must spot it in the confines of a system with a high signal to noise ratio—a task that is cumbersome and unrealistic in a modern manufacturing facility.

To remedy this, an SDS of an embodiment uses a trained spatial classifier that is capable of detecting a number of potential safety violations on an individual person, coupled with a temporal classifier that is intended to identify key gestures associated with equipment startup. If both of these conditions are met—a person is exhibiting unsafe behavior, and a person is moving to begin using a piece of equipment, then—and only then—will a safety alert be presented on a decision support system.

Figure 1:
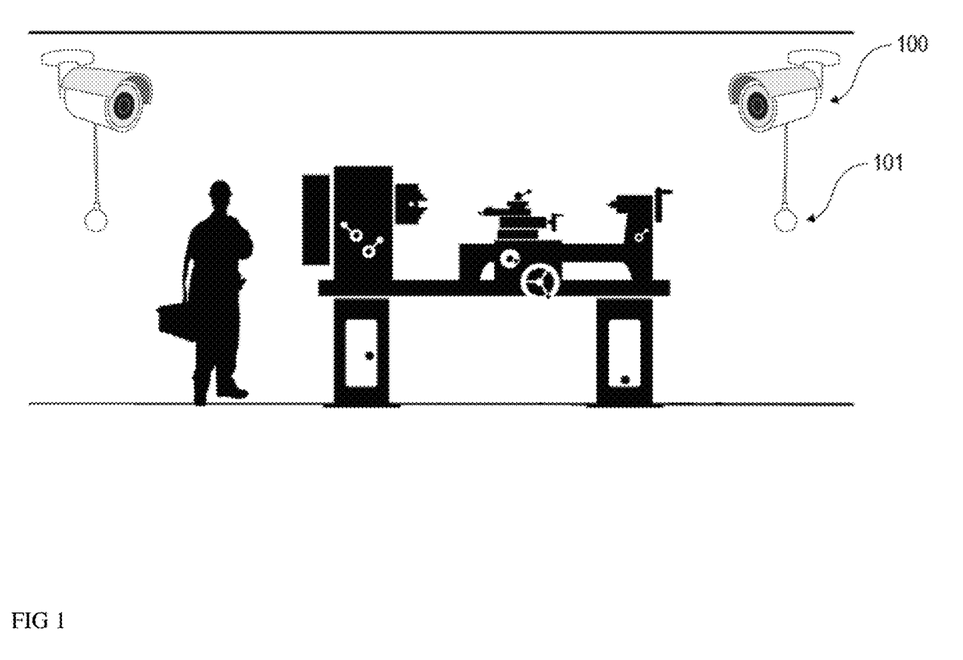
FIG. 1 illustrates an example method of rapidly assessing the safety of a human in an industrial setting using multispectral imaging and computer vision.

An embodiment provides a solution in the form of a camera unit that detects beyond visual fields. As shown in FIG. 1, a standard CCTV camera 100 can be equipped with a multispectral suite of sensors 101, including but not limited to closed-circuit television, RGB image data, infrared data, mm-wave data, audio signals, THz spectroscopy, radar signals and LIDAR signals. A single camera unit with sensor package has the ability to collect data from a variety of distributed sensors in the environment, including but not limited to mobile phones, desktop computers, or single-purpose embedded devices, such as wearable devices.

Individual frames that comprise these actions may be detected with spatial classification platforms like YOLOv3. The core effort of this phase involves collecting and analyzing a large quantity of operator data in order to identify the actions that can be reliably quantified to indicate each activity. To some extent this will vary from operator to operator, but some actions will likely be universal. The result of the temporal classifier will be a Safety Activity Threshold (SAT) score that will indicate the probability that a user is about to intentionally engage with a piece of equipment. This SAT score is specifically intended to be a range so that the threshold can be tuned depending on operational parameters, rather than a binary yes/no status check. A high SAT score indicates a high probability of intentional action, and if combined with a safety check would trigger a message to the decision support system. A low SAT score indicates that a worker may merely be in the presence of equipment, but is not actively engaging with it. Thus, if they are not wearing proper PPE, an alarm should not be triggered as they are not operating machinery.

Figure 2:
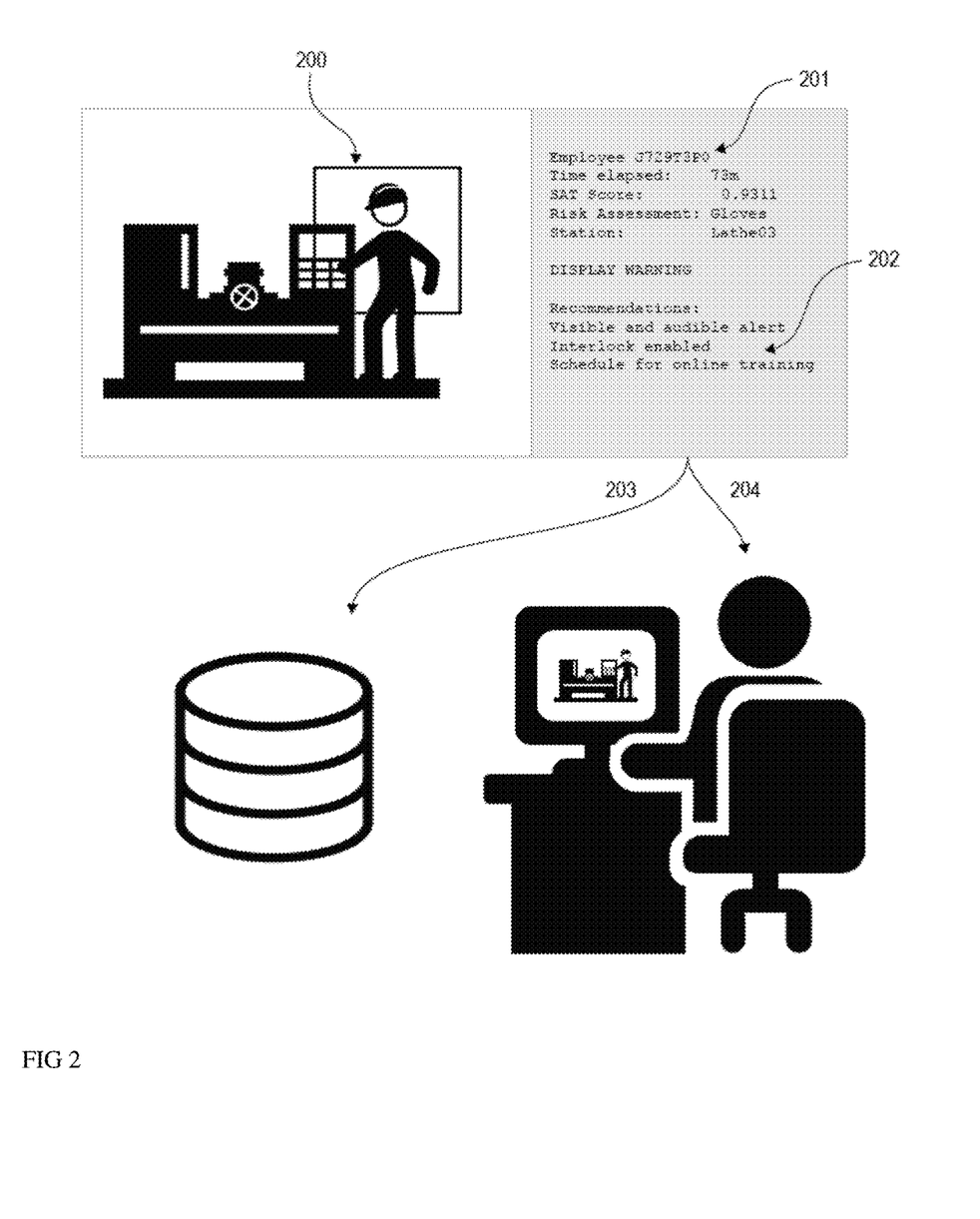
FIG. 2 illustrates an example of the computing device or system's output with a Safety Activity Threshold (SAT) along with possible safety issues and recommendations as output from the algorithms prediction may be entered into a database for offsite processing or by a human observer that will analyze video and multispectral feeds.

The collected data is analyzed either in real-time or stored in a database for later evaluation. As shown in FIG. 2, an embodiment collects video and multispectral data and creates a visualized output of the subject analyzed 200, with detailed information that may include, but not limited to time elapsed, machinery equipment type, PPE, and their aggregated SAT 201. In addition, the output may include decision support protocols that may include to support finding medical attention or informing a medical facility, the optimal time frame to take the suggested course of action and contact information to aid in the facilitation of the recommended steps 202. The visualized output, as well as the raw data associated with the algorithmic visualization could then be passed to a database 203 and/or to a computer terminal with human observer 204.

An embodiment of the internal logic used to create such a decision is illustrated in FIG. 2. Such a system could take a range of actions 202—notifying management, activating an electronic interlock or showing a message to a user. In one example, a system that, as configured, will show a message to the operator informing them of a potential safety violation, especially as development continues to refine the model. In an embodiment, a user may be able to download a trained model, upload it to a single board computer and test it in a facility—receiving feedback from operators and employees, without extensive effort through a technical backend.

This system may be linked to employee identifiers to identify employees in need of retraining and give management valuable action on compliance and response to safety notices. If particular employees consistently dismiss safety violations, this system can log that behavior, enabling a subsequent follow-up. Similarly, if employees report that the system is misclassifying something about them, this feedback can be used to retrain and update the model.

Figure 3:
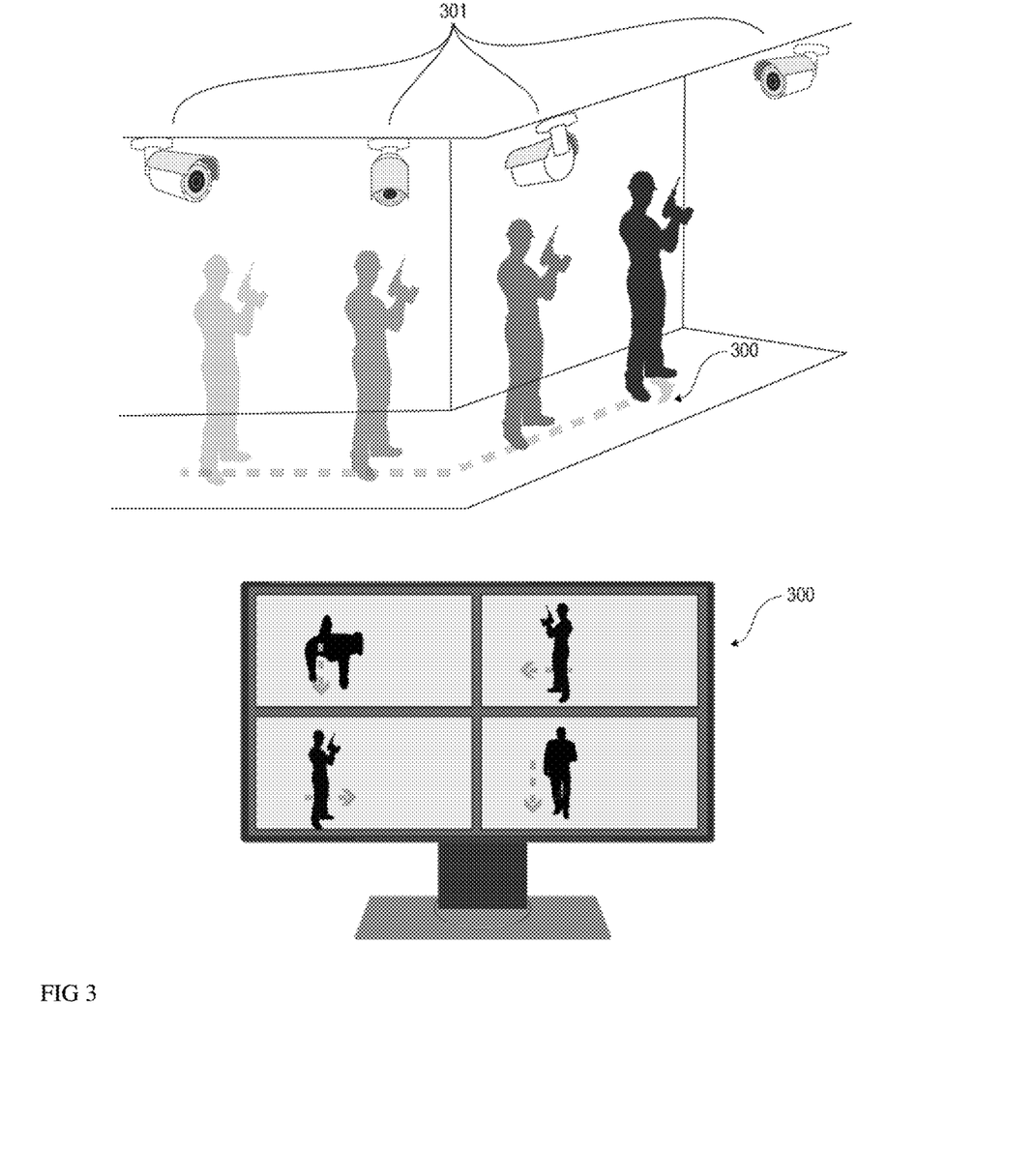
FIG. 3 illustrates as an example a person walking through a field of sensors, both visual and multispectral over a period of time, tracking the subject across different fields of vision. The composite score from multiple viewing angles are weighted into the person's Safety Activity Threshold (SAT).

As a function of accurately being able to identify an individual's SAT, the system must be able to integrate multiple camera units containing a composite of video and multispectral data. In an embodiment, as shown in FIG. 3, an individual 300, traveling across multiple camera's field of view may combine multiple camera systems 301 across different visual and spectral environments, accurately identifying the same individual from different angles and points of view. In addition, the multi camera system may track an individual with persistence, using the suite of sensors to create a temporary unique composite identifier, across different camera units and fields of view 302.

Detecting safety violations that may exist on an individual person—such as the presence or absence of gloves, loose clothing and long hair, is the primary function of the normalization algorithm. The SDS can more effectively leverage off-the-shelf components, such as YOLOv3, however it has been discovered that preprocessing of images in a training data set can have a significant impact on model accuracy. For example, if a model is to be deployed in a real-world situation with low light and interlaced video, applying similar transformations to the training data set that will be used to train the model and lead to a significant improvement—initial internal tests have shown a 5-7% improvement to in-class accuracy without further refinement.

Thus, the collection and development of a dataset to identify common safety violations and a normalization engine that will automatically extract key environmental parameters from a deployment environment, and using those parameters to automatically transform training data to produce a bespoke model for said environment.

Figure 4:
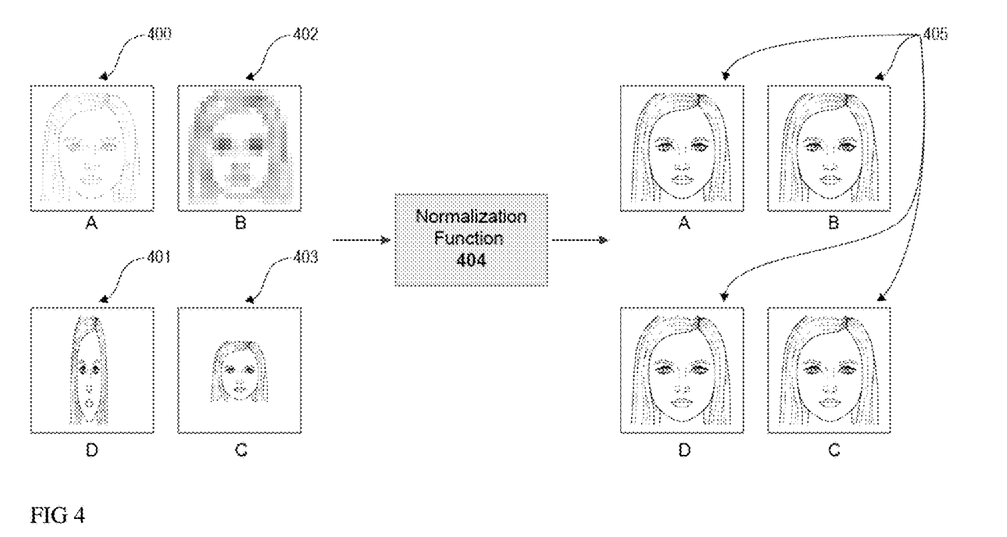
FIG. 4 illustrates as an example the algorithmic adjustment of a person's distorted image due to a variety of input limitations, including but not limited to Aspect ratio, pixelation, size of person in photo, brightness/contrast. The algorithmic transformation results in normalized video feed, enhancing accuracy of the input data for the algorithm to objects and gestures to enhance workplace safety.

A processor may analyze data, including but not limited to image and spectral data consisting of a combination of one or more of brightness, contrast, resolution, dimensions, aspect ratio, color saturation, noise level, signal intensity and refresh rate to determine a signature for a given location. Then, using a processor, the system may perform transformations that can be applied to incoming data to normalize said data to match the location signature previously determined and identify differences between training a model using normalized data and untransformed signals. As shown in FIG. 4, an embodiment demonstrates that raw video input may be subject to brightness 400, aspect ratio dilation 401, contrast 402, pixelation 403, but through the use of the system via processor, the images may be normalized 404, increasing the accuracy for a viral infection score when then read by the artificial intelligence algorithm. An algorithm preprocessing step that normalizes images before being run through an artificial intelligence algorithm enhances accuracy of the inference score. In an embodiment of concept, utilizing several CCTV and multispectral camera systems 301 across an office building may have identified an individual 300 exhibiting gestures and multispectral data suggesting they may have an infectious or contagious disease. The individual is transiting across several camera views, thus their input image and data signature is changing as a function of natural and artificial lighting causing oversaturation of the images 400, rapid movement causing pixelation 402, and moving towards and then away from the observing camera 301 causing aspect ratio dilation 401. Through the normalization function step 404, the algorithm can maintain persistence tracking of the individual with greater accuracy than using the preprocessed images.

While an embodiment may be deployed as a standalone computer and camera system(s) to serve as integrated safety monitoring systems, correcting for differences in lighting/brightness/contrast, focus and distance allows this system to be retrofitted into existing CCTV systems that may already be in place in a building (in addition to improving the accuracy of the standalone units). By leveraging transforms that compensate for the low quality of analog NTSC cameras that may have drifted out of focus, an embodiment significantly increases the proposed value of such a safety system by minimizing barriers to entry.

Figure 5:
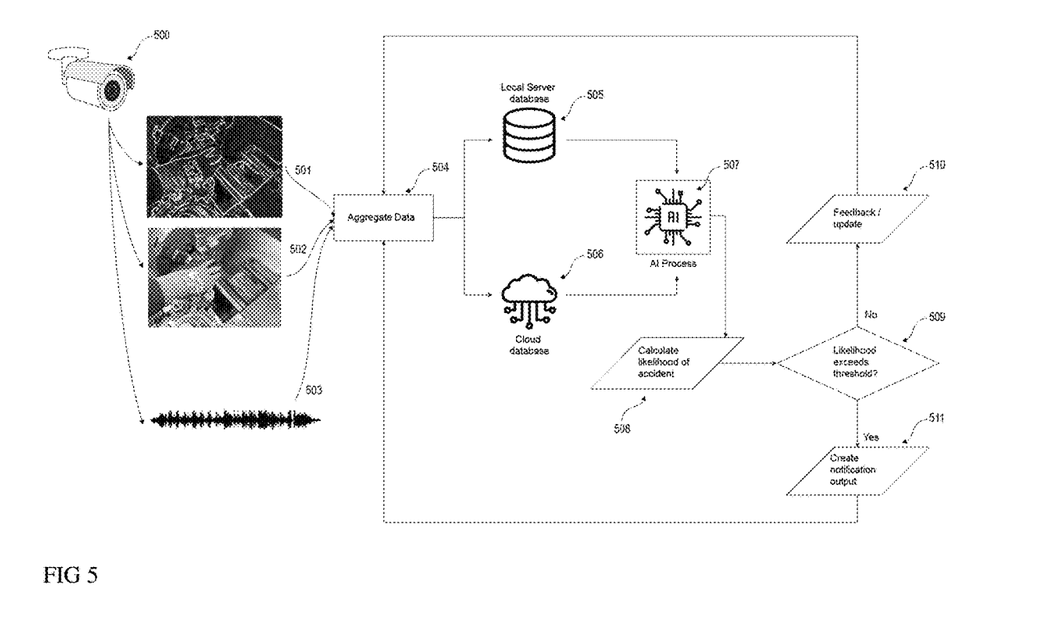
FIG. 5 illustrates as an example the software architecture required to process the video and multispectral feeds, how it's processed, analyzed and stored.

The processing of streaming video data is a function of the data aggregation and how the data is processed, stored, propagated as a function of decision support. In the embodiment, as shown in FIG. 5, the camera system 500 may receive and process multiple parallel signals feeds including visual video 501, thermal video 502 and audio signals 503, which are then processed at the location (on the edge) and aggregated 504. The aggregated data 504 may be normalized through a pre-artificial intelligence processing algorithmic step delineated in FIG. 4 as the normalization process 404. Once the data feeds are consolidated and pre-processed, the data may be retained on local servers and databases 505 and/or transmitted to a distributed cloud processing server (e.g., Amazon Web Services) 506. At the respective location, the consolidated and curated feed 504 will be processed through a convolutional neural network 507. The algorithm is trained on thousands of examples that creates a baseline accuracy for inference. The artificial intelligence model trained on thousands of hours of video and multispectral data contains a variety of classifiers that may include, but not limited to: i) specific types of machinery (i.e., lathe, circular saw, drill press, etc.), ii) the function of a dangerous movement as defined by gestural movements with the hand, arms, hair, legs and feet, iii) thermal abnormalities on machinery, iv) auditory sounds that indicate human distress, and/or v) abnormal auditory machinery frequencies/vibration patterns.

The artificial intelligence model inputs the visual, auditory and other multispectral inputs and performs an inference calculation that is a summation of accident events. The algorithm may identify an individual and identify a series of distinguishing characteristics that enables persistent tracking of an individual 302. Throughout the duration of persistence tracking for the individual, the algorithm will collect and analyze data leveraging the aforementioned variables, in combination or individually to calculate the likelihood of an accident event 508. The algorithm may discard data that has been determined to generate a false positive, for example, if the human gestures in a similar manner to an injury as part of the data, the gestures may resemble certain safety violation behaviors, however the sound, machine telemetry or power state data, and other visual and multispectral data may indicate a higher probability for a false positive, and thus the model may require further signals before concluding calculation of the score indicating a safety violation.

An embodiment of the output may add a data layer that annotates the respective video and multispectral data streams with safety activity threshold data, that may include auditory signals, visual targets, equipment power-state, or recommended protocols. If the likelihood of an accident has been demonstrated in the trained model to cross the threshold of a person with a plausible probability, it will generate an accident notification output data flow that may inform people monitoring the system through a combination of possible alerts, emails, text notifications, phone calls, or dispatch signals. Different accident scenarios may be identified by the algorithm, for example a lathe accident, versus improper loading of drill bits can be determined through a combination of auditory and visual variables, previously mentioned. Based on the machine or activity, different thresholding limits can be created. In an embodiment for determining predicting a lathe accident, the algorithm may be trained to weight certain events with more importance, for example objects dangling such as badges, hair or lanyards. In another embodiment, the algorithm may be trained to improper circular saw blade loading by feeding audio inputs of metal on metal grinding frequencies. For the calibrated accident classifier, the determination of illness from the calculated score 508 will reach a logic gate 509 wherein either the score remains below the threshold score determined and proceeds through a feedback and update loop 510, and reporting updated data to the aggregated data 504 and repeats through the logic loop, or the classifier threshold is exceeded wherein the a new notification will be generated 511 and the data will be combined with newly aggregated data 504 and repeats through the logic loop for continual data processing.

In an embodiment, a temporal classifier is designed to detect actions that are likely to result in machine startup or other contextual data. Video data of users engaging with a specific piece of equipment allow for development of a system that can detect actions that indicate equipment startup is imminent. In an embodiment, a normalization algorithm 404 is connected to an existing spatial classifier in order to train a model of key safety violations in a variety of environments. An embodiment may involve the generation of synthetic data by multiple algorithms. In an embodiment, the algorithms may be integrated systems and contribute to the design of a decision support system that presents visual feedback to a user. An embodiment may be a system that may be tested in a manufacturing facility so that the initial design can be improved with iterative feedback training loops from aggregated data.

Figure 6:
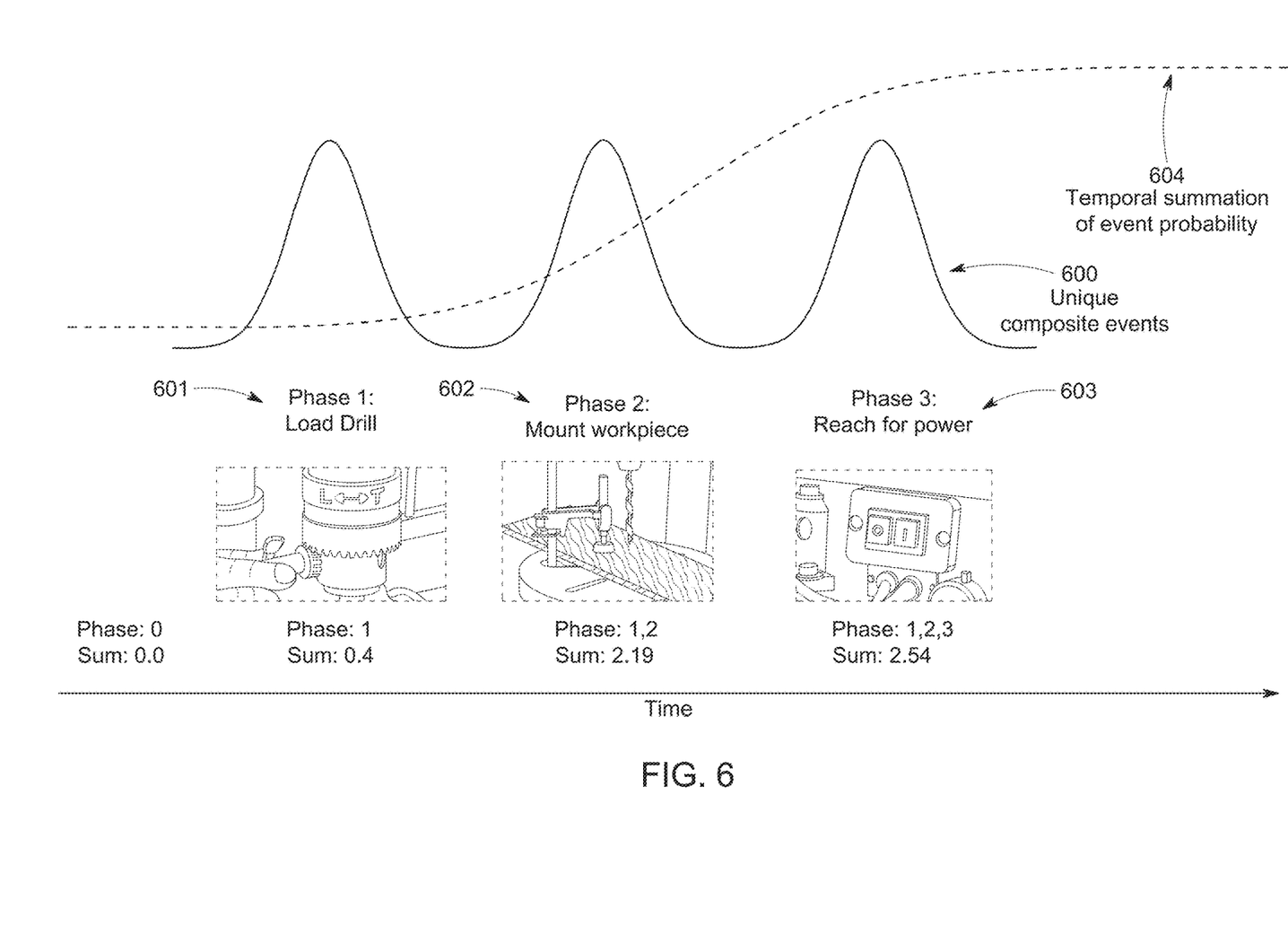
FIG. 6 illustrates the temporal classifier algorithm's summation of separate and unique events, individually having low significance, yet summed, represent imminent usage of a machine with safety implications for the user.

FIG. 6 depicts a temporal strategy to detect actions indicative of active engagement with equipment or machine tooling. The individual and unique composite events (i.e., actions and gestures) 600 are recognized by the algorithm. These actions could include a user bringing a workpiece near an active machine, moving to press a start button, engaging with a guard or interlock, or some other machine specific behavior. Data about these actions will be obtained from observation of a real worksite, and this data is analyzed in order to identify key phases of engagement that, in summation, form a larger composite event 604.

As illustrated in FIG. 6, a user about to engage with a drill press, may perform a series of actions: loading a drill into the chuck 601, mounting a workpiece to the table 602, and activating power to the device 603. This list is not intended to be exhaustive, but rather illustrate how key actions can be used to classify a signature for engaging with a drill press. Users may not be able to effectively drill without loading a drill, mounting a workpiece and applying power, thus, if a system detects the presence of these three events, it may predict that the user may intend to engage with the system and that safety conditions should be checked and applied 604.

With a temporal classifier integrated with a normalized model capable of detecting common safety hazards, the results will then be fed into a decision support tool. An embodiment uses a database that will log SAT scores and high probability safety violations throughout the course of operation for subsequent review. However, if a high SAT score is triggered in conjunction with one or more safety violations, the system will be configured to provide immediate notice to an employee or operator.

It will be readily understood that certain embodiments can be implemented using any of a wide variety of devices or combinations of devices. Referring to FIG. 7, an example device that may be used in implementing one or more embodiments includes a computing device (computer) 710. In this regard, a computing device 710 may be operatively coupled to safety system, devices and/or modules as described herein and provide services (data capture and storage, data analysis, data summary and indicating, and the like). For example, computing device 710 may provide analysis and reporting of safety information via computer-vision based analysis of data, as described herein.

The computing device 710 may execute program instructions configured to analyze image data and perform other functionality of the embodiments, as described herein. Components of the computing device 710 may include, but are not limited to, a processing unit 720, a system memory 730, and a system bus 722 that couples various system components including the system memory 730 to the processing unit 720. The computer 710 may include or have access to a variety of computer readable media, for example for storing image data, program routines for evaluating image data for predicted or identified safety violations, etc. The system memory 730 may include computer readable storage media in the form of volatile and/or nonvolatile memory such as read only memory (ROM) and/or random-access memory (RAM). By way of example, and not limitation, system memory 730 may also include an operating system, application programs, other program modules, and program data.

A user can interface with (for example, enter commands and information) the computing device 710 through input device(s) 740. A monitor or other type of device can also be connected to the system bus 722 via an interface, such as an output interface 750. In addition to a monitor, computers may also include other peripheral output devices. The computing device 710 may operate in a networked or distributed environment using logical connections to one or more other remote computers or databases (remote device(s) 770) via network interface(s) 760. The logical connections may include a network, such as a local area network (LAN) or a wide area network (WAN), but may also include other networks/buses.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable, non-transitory, medium(s) having device readable program code embodied therewith.

It should be noted that the various functions described herein may be implemented using instructions stored on a device readable storage medium, such as a non-signal storage device, that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on a single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining, using one or more sensor systems, sensor data for one or more persons in an environment comprising machinery;
   analyzing, using a processor, the sensor data comprising a plurality of images, each image having a temporal characteristic, the analyzing being based on a trained model comprising a temporal classifier configurable to:
      identify, based on one or more spatial characteristics, two or more images from the plurality of images, each of the two or more images showing the one or more persons engaging in at least one action indicative of engagement with the machinery;
      determine, based on temporal characteristics of the two or more images, that the at least one action is associated with a composite event; and
      determine, based on the one or more spatial characteristics, that the one or more persons are performing the composite event in behavior indicative of an unsafe practice; and
   thereafter presenting safety information to a visual display system, connected software system or other decision support tool;
   wherein to determine that the one or more persons are performing the composite event in the behavior indicative of the unsafe practice is based on a Safety Activity Threshold (SAT);
   wherein the sensor data further comprises machine state data, and wherein the SAT is contextually adjusted based on the machine state data; and
   wherein the processor contextually adjusts the SAT to indicate an increased probability that the one or more persons are performing the composite event in the behavior indicative of the unsafe practice responsive to the machine state data indicating that the machinery is active.

2. The method of claim 1, wherein the sensor data is a combination of one two or more of closed-circuit television, RGB image data, infrared data, mm-wave data, THz spectroscopy, audio signals, radar signals and LIDAR signals.

3. The method of claim 1, wherein the sensor data is obtained from a single camera system with multiple modes of operation as a multispectral imager.

4. The method of claim 1, wherein sensor data is collected from a network of distributed sensors throughout the environment, including one or more of mobile phones, desktop computers or single-purpose embedded devices.

5. The method of claim 1, wherein the safety information is presented on the visual display system in real time.

6. The method of claim 1, wherein the behavior indicative of an unsafe practice is stored in a database and updated continuously over time.

7. The method of claim 1, comprising receiving operator feedback relating to the presented safety information.

8. A system, comprising:
   one or more sensors;
   one or more processors; and
   a non-transitory storage device operatively coupled to the one or more sensors and the one or more processors, the non-transitory storage device comprising code executable by the one or more processors and configured to:
   obtain sensor data for one or more persons in an environment comprising machinery;
   analyze the sensor data comprising a plurality of images, each image having a temporal characteristic, based on a trained model comprising a temporal classifier configurable to:
      identify, based on one or more spatial characteristics, two or more images from the plurality of images, each of the two or more images showing the one or more persons engaging in at least one action indicative of engagement with the machinery;
      determine, based on temporal characteristics of the two or more images, that the at least one action is associated with a composite event; and
      determine, based on the one or more spatial characteristics, that the one or more persons are performing the composite event in behavior indicative of an unsafe practice; and
   thereafter provide safety information to a visual display system, connected software system or other decision support tool;
   wherein to determine that the one or more persons are performing the composite event in the behavior indicative of the unsafe practice is based on a Safety Activity Threshold (SAT);
   wherein the sensor data further comprises machine state data, and wherein the SAT is contextually adjusted based on the machine state data; and
   wherein the one or more processors contextually adjusts the SAT to indicate an increased probability that the one or more persons are performing the composite event in the behavior indicative of the unsafe practice responsive to the machine state data indicating that the machinery is active.

9. The system of claim 8, wherein the sensor data is a combination of one or more of closed-circuit television, RGB image data, infrared data, mm-wave data, THz spectroscopy, audio signals, radar signals and LIDAR signals.

10. The system of claim 8, wherein the sensor data is obtained from a single camera system with multiple modes of operation as a multispectral imager.

11. The system of claim 8, wherein sensor data is collected from a network of distributed sensors throughout the environment, including one or more of mobile phones, desktop computers or single-purpose embedded devices.

12. The system of claim 8, wherein the safety information is presented on the visual display system in real time.

13. The system of claim 8, wherein a determination that the one or more persons are performing the composite event in the behavior indicative of an unsafe practice is stored in a database and updated continuously over time.

14. A computer program product, comprising:
   a non-transitory storage device comprising code executable by a processor and configured to:
   obtain sensor data for one or more persons in an environment comprising machinery;
   analyze a time series of images of the sensor data comprising a plurality of images, each image having a temporal characteristic, based on a trained model comprising a temporal classifier configurable to:

identify, based on one or more spatial characteristics, two or more images from the plurality of images, each of the two or more images showing the one or more persons engaging in at least one action indicative of engagement with the machinery;

determine, based on temporal characteristics of the two or more images, that the at least one action is associated with a composite event and an associated time series of actions; and determine, based on the one or more spatial characteristics, that the one or more persons are performing the composite event in behavior indicative of an unsafe practice; and thereafter provide safety information to a visual display system, connected software system or other decision support tool;

wherein to determine that the one or more persons are performing the composite event in the behavior indicative of the unsafe practice is based on a Safety Activity Threshold (SAT);

wherein the sensor data further comprises machine state data, and wherein the SAT is contextually adjusted based on the machine state data; and wherein the processor contextually adjusts the SAT to indicate an increased probability that the one or more persons are performing the composite event in the behavior indicative of the unsafe practice responsive to the machine state data indicating that the machinery is active.

* * * * *